United States Patent [19]

Nagano

[11] Patent Number: 4,691,228
[45] Date of Patent: Sep. 1, 1987

[54] IMAGE READER

[75] Inventor: Fumikazu Nagano, Yamatokoriyama, Japan

[73] Assignee: Sharp Kabushiki Kaisha, Osaka, Japan

[21] Appl. No.: 746,762

[22] Filed: Jun. 20, 1985

[30] Foreign Application Priority Data

Jun. 22, 1984 [JP] Japan .................................. 59-129888
Aug. 22, 1984 [JP] Japan .................................. 59-175352

[51] Int. Cl.⁴ .............................................. H04N 1/46
[52] U.S. Cl. ........................................ 358/75; 358/80
[58] Field of Search ............................. 358/75, 80, 41

[56] References Cited

U.S. PATENT DOCUMENTS 4,318,122  3/1982  White ..................................... 358/41
4,517,591  5/1985  Nagashima et al. ............. 358/78 X
4,546,381  10/1985  Kurata et al. ...................... 358/75 X
4,577,218  3/1986  Kurata ................................... 358/80

FOREIGN PATENT DOCUMENTS 58-164367  9/1983  Japan ..................................... 358/75

Primary Examiner—Britton Howard W.
Attorney, Agent, or Firm—Birch, Stewart, Kolasch & Birch

[57] ABSTRACT

In this invention there is disclosed a color image reader being able to read in three modes, a black and white mode, a color mode and a dropped color mode. The reader includes three fluorescence lamps for illuminating a document to be read, each lamp having their own peaks in red, green and blue light zones respectively, an optical system for obtaining a real image of the document therethrough, a single image sensor being arranged at the position where the real image is focused, a mode selection device for choosing one mode from the three modes and a control device for lighting every fluorescence lamp in such a manner that three fluorescence lamps are turned on and off sequentially and successively when the color mode is chosen and, when the black and white mode is chosen, all of them are turned on at the same time.

9 Claims, 6 Drawing Figures

IMAGE READER

FIELD OF THE INVENTION

The present invention relates to an image reader being capable of reading the image of a document both in color mode and in a black and white mode.

BACKGROUND OF THE INVENTION

One of the typical conventional color image readers has such a structure that a document to be read is illuminated by a white light emitted from a single source thereof, the reflected light from the document is separated into three primary colors and each separated light is received by each image sensor formed with a linear array of micro charge coupled devices (CCD).

In another type of the conventional color image reader, there is provided a single light source of white color, three color filters provided for passing red, green and blue lights therethrough respectively and one image sensor constituted with CCD wherein lights having been filtered by three color filters respectively are sequentially projected onto the image sensor.

It is not impossible to read an image in a black and white mode with use of such a color image reader as mentioned above. In order to do that, it becomes necessary to combine color data by suitable electric circuits which are obtained as the result of the separation of the reflected light into three primary colors.

However, a ROM (Read Only Memory) of extremely large volume is needed, if one tries to achieve such combination with use of ROM or additional circuits. Also, if one tries to achieve such a combination with use of an electric computer, it takes much time in translating color data into black and white data and, therefore, the reading velocity is slowed down.

Moreover, the color reader will be further complicated and large scaled if one tries to obtain black and white data having been combined after changing a balance between color data that is to be enhanced and color data that is to be diminished.

SUMMARY OF THE INVENTION

One object of the present invention is to provide a color image reader being able to read images both in a color mode and in black and white mode by a single photo-electric conversion device.

Another object of the present invention is to provide a color image reader being able to read images in a black and white mode faster than in color mode.

One more object of the present invention is to provide a color image reader being able to read images in a black and white mode and in dropped out color modes as well as in ordinal color mode using a ROM of a minimum volume.

According to the present invention, there is provided a color image reader being able to read in a black and white mode comprising;

three flourescent lamps for illuminating a document to be read which have their own peaks in red, green and blue light zones respectively.

an optical system for obtaining a real image of the document therethrough, a single image sensor being arranged at the position where the real image is focused.

a mode selecting means for choosing one mode out of at least two reading modes including an ordinal color mode and a black and white mode, and a control means for lighting every flourescent lamp in such a manner that three flourescent lamps are turned on and off sequentially and successively when the color mode is chosen and, when the black and white mode is chosen, all of them are turned on at the same time.

BRIEF DESCRIPTION OF THE DRAWINGS

The present invention will now be described more in detail by way of examples and with reference to the accompanying drawings in which.

DESCRIPTION OF THE PREFERRED EMBODIMENT

Figure 1:
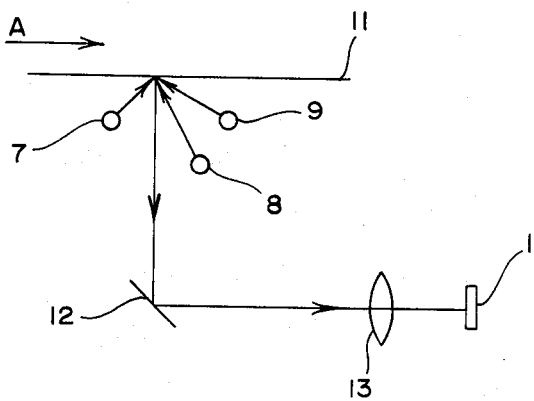
FIG. 1 is a schematic view showing the optical system of a preferred embodiment of the present invention.

FIG. 1 shows schematically an optical system of an image reader according to the present invention.

As shown in FIG. 1, three flourescent lamps 7, 8 and 9 for emitting three primary lights respectively are arranged at almost equal distance from the reading line (scanning line) being set upon a document 11 so as to illuminate the reading line. A reflecting mirror 12 and a focusing lens assembly 13 are so arranged that the reflection light reflected from the reading line can be focused on an image sensor 1. The image sensor 1 is comprised of linear array of n CCD, as is known to those skilled in the art, and is able to read a line image on the reading line as n analog data. The document 11 is scanned in a direction as indicated by an arrow A and the whole image of the document is obtained by the scanning.

Figure 2:
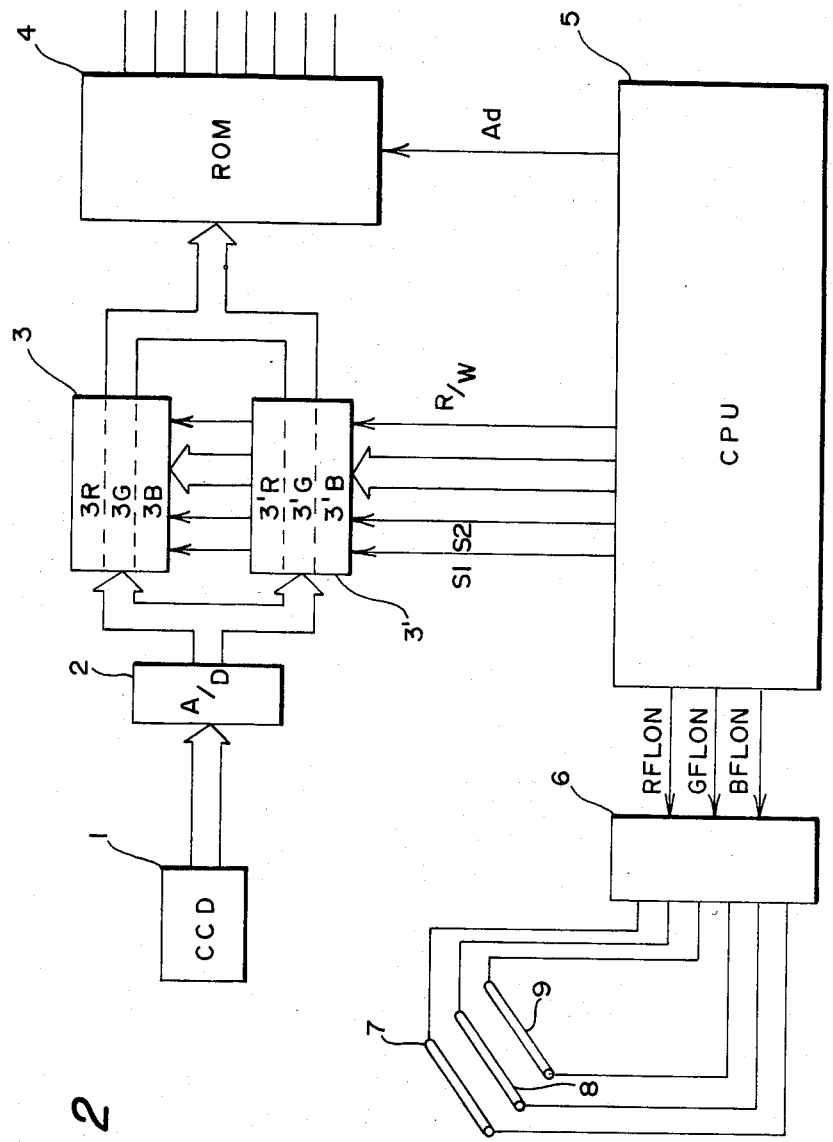
FIG. 2 is a block diagram showing the processing circuits of the preferred embodiment of the present invention.

FIG. 2 shows a block diagram of the processing circuits of the image reader.

The image sensor 1 applies n analogue data to an analog-digital converter 2 (A/D). A/D converter 2 converts each analog datum to an m-bit digital data and transmits it to a memory 3 or 3'. Each memory 3 or 3' applies the data having been input to the memory to the ROM 4. The memories 3 and 3', having the same composition, are so correlated with each other that when either one memory is writing data from the A/D converter 2, the other memory may output the data stored therein to the ROM 4. This is to increase the reading velocity of the reader by executing the input from the A/D converter 2 and the output to the ROM 4 at the same time.

The central processing unit (CPU) 5 of the computer outputs a signal Ad for converting reading mode to the ROM 4. The ROM 4 outputs, when the signal Ad is high ("1"), binary signals corresponding to black or white after converting digital data (the number of tones of the data is given with $2^m$) being input from either one memory 3 or 3', and, when the signal Ad is low ("0"), the ROM 4 outputs digital data being input without any conversion thereof.

The CPU 5 also outputs a Read-Write signal R/W for indicating "Read" or "Write" and outputs address signals through the address bus, for indicating each address of the data to be read or to be written.

Each memory 3 or 3' is comprised of a memory for a red signal 3R or 3'R, a memory for a green signal 3G or 3'G and a memory for a blue signal 3B or 3'B. The CPU 5 outputs two signals $S_1$ and $S_2$ for designating one pair of memories to be used. These memory-select-signals $S_1$ and $S_2$ are binary signals of one bit. The memories for red signal 3R and 3'R are designated when $S_1=$"0" and $S_2=$"0", the memories for green signal 3G and 3'G are designated when $S_1=$"1" and $S_2=$"0", and the memories for blue signal 3B and 3'B are designated when $S_1=$"1" and $S_2=$"1".

Further, the CPU 5 outputs a red-lighting signal RFLON, a green-lighting signal GFLON and a blue-lighting signal BFLON to a lighting circuit 6 for turning on or off the three fluorescent lamps respectively. The lighting circuit 6 operates to turn on each fluorescent lamp corresponding to the lighting signal when it becomes high.

According to the choice of the number and color of the lamp to be turned on, a variety of colors are obtained as shown in the following table.

| Lamp(s) Lighted | Color Resulted |
| --- | --- |
| Red, Green, Blue | White |
| Red, Green | Yellow |
| Green, Blue | Cyanine |
| Blue, Red | Magenta |
| Red | Red |
| Green | Green |
| Blue | Blue |

When all three of the flourescent lamps are lit, the light illuminating the document is a white light. Due to this, data obtained are proportional to black and white tone of the image of the document. Reading mode with use of a white light mentioned above is referred to black-white mode hereafter.

When one or two lamps are lit, the illuminating light has a specified color according to lighting conditions as shown in the table. Therefore, the tone obtained is determined by relation between the color of a document and the color of an illuminating light as well as by the tone of the image itself. If the image of a document has a color similar to that of the light of the light source, the tone obtained becomes thinner than that of the image of the document. If the image of a document has a color similar to a complementary color of the color of the illuminating light, the tone obtained is enhanced to that of the original image. The reading method just mentioned above is referred to as a dropped out color mode hereafter.

Figure 3A:
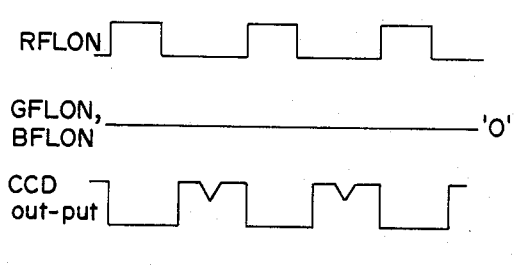
FIGS. 3(A), (B), (C) and (D) are timing charts showing one dropped color mode, another dropped color mode, black and white mode and color mode respectively.

FIGS. 3(A), (B), (C) and (D) show respectively timing charts of lighting signals and output signals of the image sensor.

FIG. 3(A) corresponds to a dropped color mode with use of the red lamp. In this mode, only a red lamp is lit. Therefore, red colored portions of the image are not hardly read and blue or green colored portions of the image are read as having been enhanced.

Figure 3C:
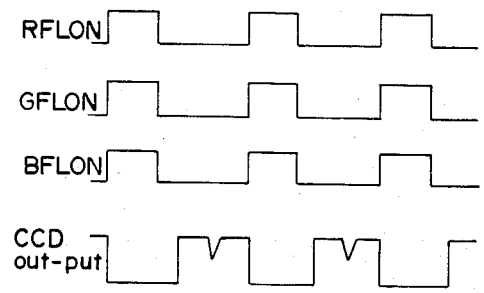
Figure 3B:
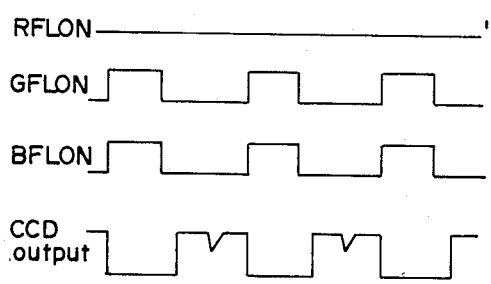

FIG. 3(B) corresponds to a dropped color mode with a cyanine light. In this mode, the green and blue lamps are lit to illuminate the document. Accordingly, the illuminating light has a cyanine color. Therefore, the green and blue colored portions of the image are not hardly read and the red colored portions thereof are read as having been enhanced.

As is easily understood from the description above, the reading mode shown in FIG. 3(A) is effective to read a document wherein the image is recorded in black or blue on a red blank form and the reading mode shown in FIG. 3(B) is effective to read a document wherein the red or black image is recorded on a blue or green blank form.

FIG. 3(C) shows a reading in black and white mode. In this mode, since all of three lamps are lit, the illuminating light is substantially a white light. Accordingly, the image of a document is read with tone proportional to that of the image of the document.

Figure 3D:
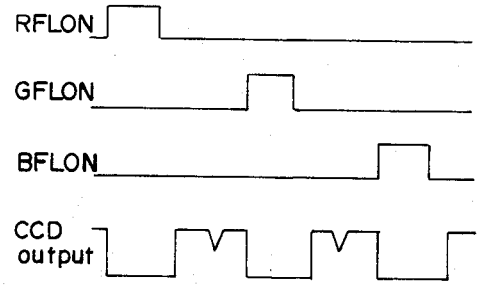

FIG. 3(D) shows a reading mode in a so-called color mode in which the three lamps are sequentially lit.

As is clear from the comparison of FIGS. 3(A) to (C) with FIG. 3(D), the reading velocity in a black and white mode or in a dropped color mode is increased to triple the reading velocity in color mode. In addition, it is clear that signals of the CCD are read out between two successive lighting signals regardless of the lighting mode as indicated by the CCD output signals in FIGS. 3(A) to 3(D).

One can specify one reading mode among these modes mentioned above, by operating the key board of the computer.

According to the present invention, once a reading mode is chosen, a driving mode for driving three flourescent lamps is determined corresponding to the reading mode chosen so as to illuminate a document with at least one light having a color suitable for reading an image in said reading mode.

Therefore, it becomes possible to read, according to the present image reader, an image not only in a color mode but also in black and white mode as well as dropped color modes. This enables a combination of color data and to distinguish a special color image to be enhanced or to be read in a tone thinner than that of the original tone by choosing a suitable color of a light for illuminating a document.

Since data obtained by the image sensor are data having been combined or distinguished optically, only analog-digital transformation and transformation of digital data into black and white binary data are needed to process data obtained.

Accordingly, electric circuits of the present color image reader are much simplified when compared with the case in which color data are combined or distinguished by a ROM means or by ROM means and a plurality of additional circuits. Further, the processing velocity according to the present invention is far faster than that obtained by processing data with use of CPU.

While there have been described the preferred embodiments, modifications and variations being obvious to those skilled in the art are possible without departing from the spirit of the invention. The scope is therefore to be determined solely by the appended claims.

What is claimed is:

1. A color image reader capable of reading a document in one scan of the document in one of three reading modes including a black and white mode, a color mode and a dropped color mode, comprising:
    three fluorescent lamps for illuminating a document to be read with incident light, each lamp developing light having its own peak in a red, a green and a blue light zone respectively;
    an optical system for obtaining a real image of the document therethrough from a reflection of the incident light by the document during a scan;

a single image sensor being arranged at the position where the real image is focused and producing a sensor signal, mode selecting means for choosing one of said three reading modes; and control means for driving the fluorescent lamps with a lighting signal in such a manner that the three fluorescent lamps are turned on and off sequentially and successively during one scan when the color mode is chosen and, the three fluorescent lamps are turned on at the same time during one scan when the black and white mode is chosen, and only two of the fluorescent lamps are lit, at the same time during one scan when the dropped color mode is chosen.

2. The color image reader of claim 1 wherein a plurality of lighting signals control the ON/OFF state of the fluorescent lamps whereby each lamp is controlled by one of said plurality of lighting signals a lighting signal, the lighting signal of a lamp that is to be turned ON being a pulse signal having a predetermined frequency such that in said black and white mode the lighting signal for each of the lamps have a pulse at the same time, in said dropped color mode two lamps have lighting signals having pulses at the same time while in said color mode each lamp has a lighting signal having a pulse at a different time, and wherein said sensor signal is read out from said sensor between any two successive pulses of said plurality of lighting signals.

3. The color image reader of claim 1 wherein said single image sensor is a charge coupled device (CCD).

4. The color image reader of claim 1 further comprising:

converter means for converting said sensor signal into digital data;

first memory means for storing said digital data;

processor means for controlling a writing of said digital data into said first memory means and for selectively reading out said digital data from said first memory means; and second memory means for storing said digital data selectively read out of said first memory means.

5. The color image reader of claim 4 wherein said first memory means includes two memory areas so that a first area can read out data while a second area can have data signals written into it in accordance with a control by said processor means.

6. The color image reader of claim 5 wherein said processor means and said control means are controlled by a central processing unit.

7. The color image reader of claim 5 wherein said single image sensor is a charge coupled device (CCD).

8. The color image device of claim 5 wherein said second memory means includes a read only memory (ROM).

9. A method for reading a color image from a document, comprising the steps of:

selecting a reading mode from one of three reading modes, a black and white mode, a color mode or a color dropped mode;

producing an incident beam by lighting selected ones of three fluorescent lamps in accordance with the selected reading mode;

lighting all three fluorescent lamps to produce the incident beam when in the black and white mode;

lighting the three fluorescent lamps sequentially one after the other to produce the incident beam when in the color mode;

lighting two of the three fluorescent lamps at the same time to produce the incident beam when in the dropped color mode;

scanning the document with the incident beam;

detecting a reflection beam of the incident beam from the document; and sensing a single image corresponding to the document from said reflection beam.

* * * * *